(12) United States Patent
Miyabara

(10) Patent No.: US 7,285,163 B2
(45) Date of Patent: *Oct. 23, 2007

(54) AQUEOUS ACTIVE ALKALI SILICATE SOLUTION HAVING HIGH MOLAR RATIO, METHOD FOR PRODUCTION THEREOF AND METHOD FOR USE THEREOF

(75) Inventor: Kouji Miyabara, Tokyo (JP)

(73) Assignee: Tososangyo Co., Ltd., Tokyo (JP)

( * ) Notice: Subject to any disclaimer, the term of this patent is extended or adjusted under 35 U.S.C. 154(b) by 573 days.

This patent is subject to a terminal disclaimer.

(21) Appl. No.: 10/472,015

(22) PCT Filed: Mar. 18, 2002

(86) PCT No.: PCT/JP02/02549

§ 371 (c)(1),
(2), (4) Date: Sep. 19, 2003

(87) PCT Pub. No.: WO02/074688

PCT Pub. Date: Sep. 26, 2002

(65) Prior Publication Data

US 2004/0089550 A1      May 13, 2004

(30) Foreign Application Priority Data

Mar. 21, 2001 (JP) .............................. 2001-081298

(51) Int. Cl.
*C04B 12/04* (2006.01)
(52) U.S. Cl. ................... 106/600; 106/635; 106/900
(58) Field of Classification Search ............ 204/251.7; 106/600, 900, 635
See application file for complete search history.

(56) References Cited

U.S. PATENT DOCUMENTS

| | | | |
|---|---|---|---|
| 3,969,266 A | 7/1976 | Iler | |
| 4,124,471 A * | 11/1978 | Lieb et al. | 423/333 |
| 4,303,487 A | 12/1981 | Carlin et al. | |
| 4,556,466 A | 12/1985 | Scott et al. | |
| 4,557,615 A | 12/1985 | Scott et al. | |
| 4,976,838 A | 12/1990 | Mani et al. | |
| 5,624,651 A | 4/1997 | Bass | |

FOREIGN PATENT DOCUMENTS

| | | |
|---|---|---|
| GB | 1 148 950 A | 2/1971 |
| JP | 58-15022 A | 1/1983 |
| JP | 03-113249 B1 | 11/2000 |

OTHER PUBLICATIONS

Patent Abstract, JP 52-43187 B2 (Asahi Glass Co., Ltd.), Oct. 28, 1997.
Patent Abstracts of Japan, JP 11-061124 A (Kyoka Tsuchi Engineering Kabushiki Kaisha, et al.) Mar. 5, 1999.
Patent Abstracts of Japan, JP 08-038123 A (Yoshio Inoue et al.), Feb. 13, 1996.
Patent Abstracts of Japan, JP 2001-009459 A (Sumitomo Heavy Industries, Ltd.), Jan. 16, 2001.
Patent Abstracts of Japan, JP 05-306112 A (Michio Uemura et al.), Nov. 19, 1993.

* cited by examiner

*Primary Examiner*—David M Brunsman
(74) *Attorney, Agent, or Firm*—The Webb Law Firm, P.C.

(57) ABSTRACT

An alkali silicate aqueous solution having intermediate characteristics between water glass and colloidal silica and having a high molar ratio ($SiO_2/(A_2O+B)$)(A: alkali metal, B: $NH_3$), a high silicon content and a high anionic activity. The alkali silicate aqueous solution has the properties: (A) the molar ratio of silicon to an alkali ($SiO_2/(A_2O+B)$) is in the range of 4 to 30, and (B) the silicon concentration in terms of an oxide ($SiO_2$ concentration) is in the range of 6.8 to 30% by weight. A process for preparing an alkali silicate aqueous solution comprises dealkalizing a starting alkali silicate aqueous solution by means of an electro-dialysis device, and then optionally concentrating the dealkalized solution by a reverse osmosis membrane method.

21 Claims, 3 Drawing Sheets

AQUEOUS ACTIVE ALKALI SILICATE SOLUTION HAVING HIGH MOLAR RATIO, METHOD FOR PRODUCTION THEREOF AND METHOD FOR USE THEREOF

This application is a 371 of PCT/JP02/02549 filed 18 Mar. 2002.

BACKGROUND OF THE INVENTION

1. Field of the Invention

The present invention relates to an alkali silicate aqueous solution having a high molar ratio ($SiO_2/(A_2O+B)$) (A: alkali metal, B: $NH_3$)), a high silicon content and a high anionic activity, a process for preparing the solution and uses of the solution.

2. Description of Related Art

An alkali silicate aqueous solution called water glass contains relatively large amounts of alkali ions in order to maintain the solution state, and therefore the molar ratio of silicon to an alkali ($SiO_2/(A_2O+B)$) (A: alkali metal, B: $NH_3$)) is usually less than 4. Although silicic acid ions and alkali ions are contained in the solution, the negative charge quantity is small, so that the anionic activity is low and the ζ potential that is an indication of the anionic activity is in the range of −14 MV or less but more than −40 MV.

On the other hand, primary particles called silicic acid sol or colloidal silica have neither internal surface area nor crystalline portion, and they are dispersed in an alkaline medium. The alkali reacts with the silica surface to form negative charge on the silica surface, and because the silica particles are negatively charged, they are stabilized by virtue of the repulsion of the negative charge between the particles. On the surface of the silica colloidal substance, however, many silanol groups (Si—OH) are present in addition to the silicic acid anions which form the negative charge. Hence, the negative charge quantity is small and the ζ potential is in the range of −25 to −38 MV.

By the dealkalization of water glass, a silicic acid sol is obtained, but a stable intermediate between the water glass and the silicic acid sol has not been obtained. The reason is that since the molar ratio is raised with the progress of dealkalization, the water glass cannot maintain the solution state thereof. When the molar ratio becomes 4.2 or more, precipitation of silica takes place and the water glass cannot maintain the solution state.

If a high-molar ratio alkali silicate aqueous solution having solution-like characteristics such as those of water glass and having a high molar ratio and a high $SiO_2$ concentration similar to the silicic acid sol is obtained, development of various uses can be expected.

That is to say, there has been desired a process to raise the molar ratio, the activity and the $SiO_2$ concentration with retaining the solution-like characteristics of the water glass.

However, the molar ratio cannot be raised by only concentrating the water glass through evaporation. For example, if a water glass product having the highest molar ratio 4.0 is concentrated to a $SiO_2$ concentration of 30% by weight, the product gels completely.

On the other hand, concentration of colloidal silica by ultrafiltration is carried out (see U.S. Pat. No. 3,969,266, U.K. Patent No. 1,148,950, Japanese Patent Laid-Open Publication No. 15022/1983, etc.). If the colloidal silica is particle-grown silica, it can be satisfactorily concentrated by the ultrafiltration. In case of the water glass, however, the amount of the low-molecular weight component such as ion is large and the yield obtained by the ultrafiltration is low. Moreover, because of large loss of ions, the anionic activity inherent in the water glass is lost.

It is an object of the present invention to provide an alkali silicate aqueous solution having intermediate characteristics between water glass and colloidal silica and having a high molar ratio ($SiO_2/(A_2O+B)$) (A: alkali metal, B: $NH_3$)), a high silicon content and a high anionic activity, a process for preparing the solution and uses of the solution.

SUMMARY OF THE INVENTION

The alkali silicate aqueous solution according to the present invention has the following properties:

(A) the molar ratio of silicon to an alkali ($SiO_2/(A_2O+B)$) (A: alkali metal, B: $NH_3$)) is in the range of 4 to 30, and (B) the silicon concentration in terms of an oxide ($SiO_2$ concentration) is in the range of 6.8 to 30% by weight.

The alkali silicate aqueous solution of the present invention preferably satisfies, in addition to the above properties (A) and (B), at least one of the following properties (C) to (F):

(C) the ζ potential is in the range of −40 MV to −80 MV, (D) the peak area at the chemical shift of −100 to −120 ppm in the $^{29}Si$-NMR measurement is 1.35 times or more of the peak area of water glass at the chemical shift of −100 to −120 ppm measured by $^{29}Si$-NMR under the same conditions as in the above measurement and is 1.20 times or more of the peak area of colloidal silica at the chemical shift of −100 to −120 ppm measured by $^{29}Si$-NMR under the same conditions as in the above measurement, (E) the transmittance within the wavelength region of 1000 to 200 nm measured by an absorptiometry is in the range of 90 to 100%, and (F) the electric conductivity is in the range of 2.1 to 30 mS/cm.

The first process for preparing an alkali silicate aqueous solution according to the present invention comprises dealkalizing a starting alkali silicate aqueous solution, which has a molar ratio ($SiO_2/(A_2O+B)$) (A: alkali metal, B: $NH_3$)) of less than 4 and a silicon concentration in terms of an oxide ($SiO_2$ concentration) of 2.0 to 12.0% by weight, by means of an electro-dialysis device.

In the first process, it is preferable to concentrate the resulting dealkalized solution by a reverse osmosis membrane method.

The second process for preparing an alkali silicate aqueous solution according to the present invention comprises:

dealkalizing a starting alkali silicate aqueous solution having a molar ratio ($SiO_2/(A_2O+B)$) (A: alkali metal, B: $NH_3$)) of less than 4 by means of an electro-dialysis device, and concentrating the dealkalized solution by a reverse osmosis membrane method.

In the above process, the reverse osmosis is preferably carried out using an alkali-resistant composite membrane of a fractional molecular weight of 100 to 20000.

In the present invention, after the electro-dialysis and/or the reverse osmosis, the resulting alkali silicate aqueous solution may be further brought into contact with a cation exchange resin.

The alkali silicate aqueous solution of the present invention is preferably used as a main agent of a ground consolidation agent.

DETAILED DESCRIPTION OF THE INVENTION

Figure 1:
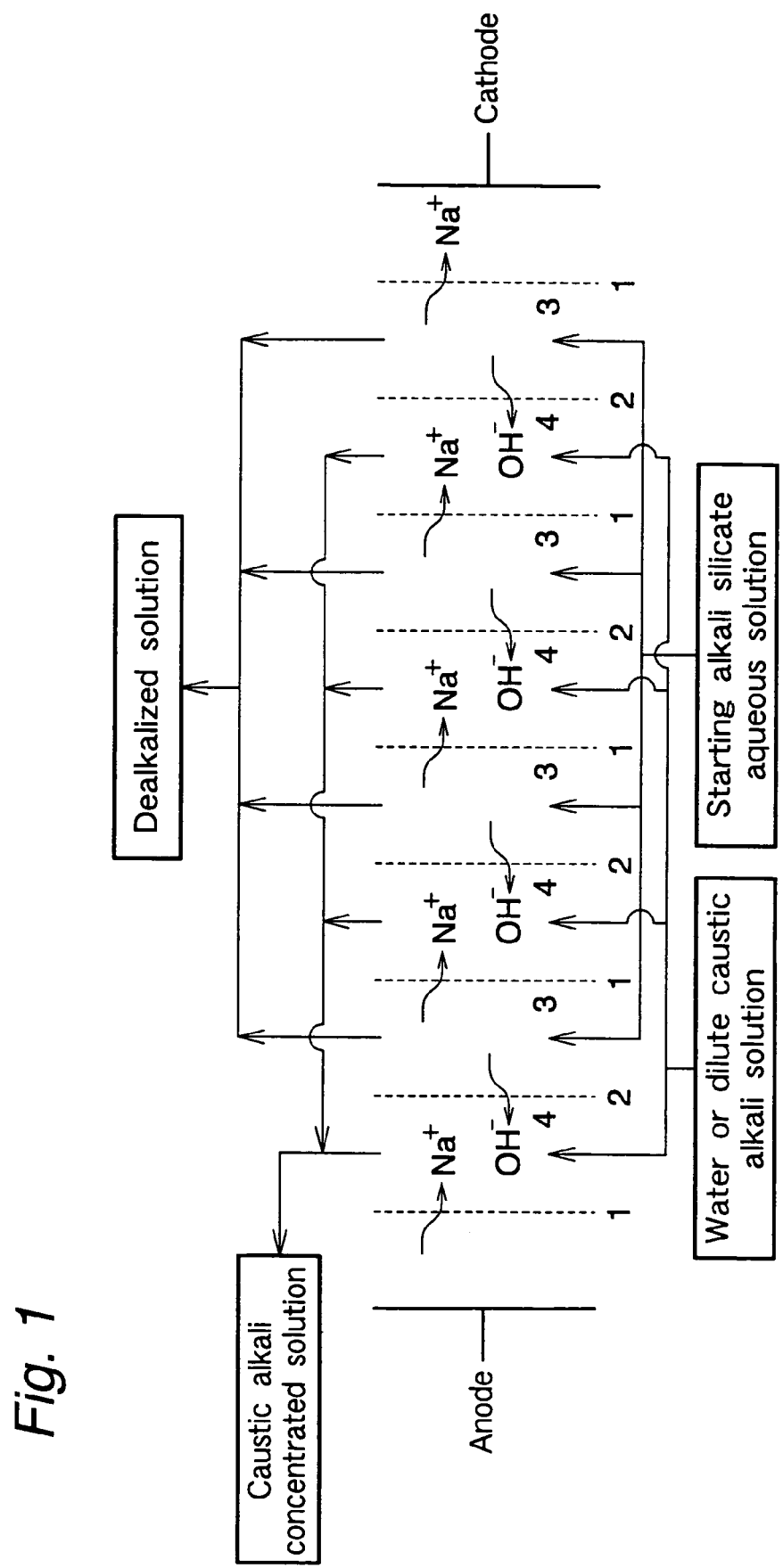
FIG. 1 is a schematic view of an electro-dialysis device used in the present invention.

The alkali silicate aqueous solution according to the invention has intermediate characteristics between water glass and colloidal silica and has a high molar ratio ($SiO_2/(A_2O+B)$) (A: alkali metal, B: $NH_3$)), a high silicon content and a high anionic activity.

That is to say, the alkali silicate aqueous solution is characterized in that the ratio of the silicon content to the alkali content is higher as compared with usual water glass. The alkali employable herein is, for example, lithium, sodium, potassium or ammonium, and most generally used is sodium.

In the alkali silicate aqueous solution of the invention, the molar ratio (A) of silicon to an alkali ($SiO_2/(A_2O+B)$) (A: alkali metal, B: $NH_3$)) is in the range of 4 to 30, preferably 9 to 26, more preferably 12 to 21. When the alkali is lithium, sodium, potassium or the like, the molar ratio is a value calculated in terms of an oxide ($A_2O$ wherein A is an alkali metal), and when the alkali is ammonium, the molar ratio is a value calculated on the basis of ammonia. The alkali metal and ammonium may be used in combination. In this specification, the expression ($SiO_2/(A_2O+B)$) (A: alkali metal, B: $NH_3$)) is sometimes referred to as "molar ratio" simply hereinafter.

If dealkalization of usual water glass proceeds to raise the molar ratio ($SiO_2/(A_2O+B)$) (A: alkali metal, B: $NH_3$)), silica is precipitated and the solution state cannot be maintained. With regard to the present invention, however, the solution state can be stably maintained. It is considered that the presence of such anions as mentioned above greatly contributes to the stable solution state. When the anionic activity is high, the silicic acid anions actively function to form an electric double layer and thereby maintain the solution state stably, even if Na that is a polymerization stopper in the water glass is removed.

In the alkali silicate aqueous solution of the invention, the silicon concentration (B) in terms of an oxide, i.e., $SiO_2$ concentration, is in the range of 6.8 to 30% by weight, preferably 8 to 26% by weight, more preferably 14 to 22% by weight.

The alkali silicate aqueous solution of the invention has a silicon concentration of almost the same level as that of a silicic acid sol or colloidal silica.

The alkali silicate aqueous solution of the invention preferably satisfies, in addition to the above properties (A) and (B), at least one of the following properties (C) to (F).

The anionic activity is evaluated by a ζ potential. In the alkali silicate aqueous solution of the invention, the ζ potential (C) is in the range of preferably −40 MV to −80 MV, more preferably −50 MV to −80 MV, particularly preferably −58 MV to −80 MV.

The ζ potential is a parameter relating to dispersion or flocculation of particles. When many particles of the same kind are dispersed in a liquid, these particles have the same electric charges. As the electric charges become higher, these particles repel each other and are held stably without being flocculated. If the particles have no electric charge or if a substance of opposite electric charge is contained, the particles are flocculated or settle immediately. The electric charges of the particles depend also on pH of the solution.

In the alkali silicate aqueous solution of the invention, the ζ potential is negative as described above, and many anionic molecules are contained, so that the solution has a high anionic activity.

The anionic molecules contained in the alkali silicate aqueous solution of the invention are extremely small, and even when compared with colloids such as colloidal silica, they are smaller. Accordingly, even if anionic particles are present, any behavior such as that of a sol is not observed in the present invention, and the alkali silicate aqueous solution can be treated substantially as a solution. This is backed up also with the transmittance described later.

Although the mode of the presence of the anionic particles is not always clear, it is thought that the particles are present as ultra-fine particles of nm order having SiO⁻ on their surfaces. Various structures of the silicic acid anions are known as described below. However, it is thought that, in the alkali silicate aqueous solution of the invention, mono- or bifunctional anions assigned to straight-chain polymers or polycyclic silicic acid anions are few, and a great number of trifunctional Q3x, trifunctional Q3y and tetrafunctional Q4 are contained.

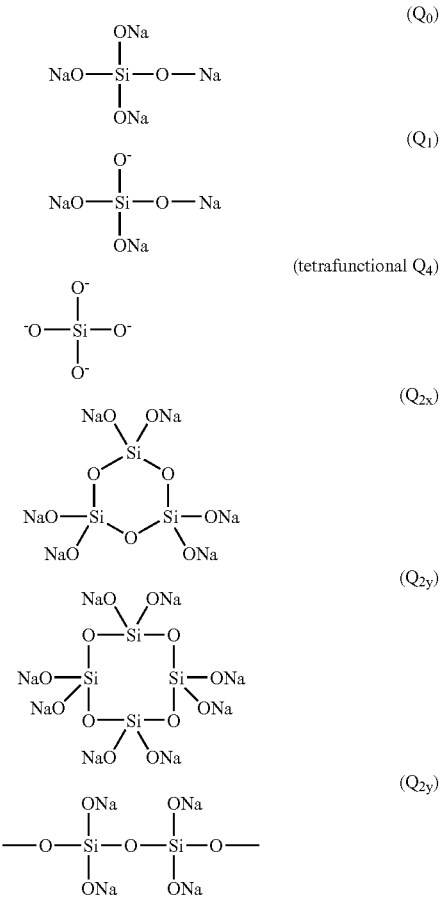

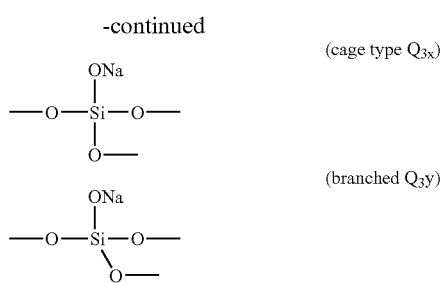

In the usual colloidal silica, few of such anions as described above are present, and the ζ potential is in the range of about −25 MV to −38 MV. Although the water glass contains anions, the ζ potential is in the range of about −14 MV to −40 MV because of few polyfunctional anion portions.

The alkali silicate aqueous solution of the invention has a high anionic activity as described above, and hence development of use application, such as yield improver in the paper making, heat-resistant binder, catalyst, inorganic coating agent, reinforcing agent, anti-slip gloss agent, adhesive, material of porous product and insulating material, is expectable.

(D) The peak area at the chemical shift of −100 to −120 ppm in the $^{29}$Si-NMR measurement is 1.35 times or more, preferably 1.35 to 2.5 times of the peak area of water glass at the chemical shift of −100 to −120 ppm measured by $^{29}$Si-NMR under the same conditions as in the above measurement and is 1.20 times or more, preferably 1.20 to 1.33 times of the peak area of colloidal silica at the chemical shift of −100 to −120 ppm measured by $^{29}$Si-NMR under the same conditions as in the above measurement. It can be seen from this result that, in the alkali silicate aqueous solution of the invention, mono- or bifunctional anions assigned to straight-chain polymers or polycyclic silicic acid anions are few, and a great number of trifunctional Q3x, trifunctional Q3y and tetrafunctional Q4 are contained.

The peak area is determined by correcting a base line and then calculating from an area enclosed with a vertical axis at −100 ppm, a vertical axis at −120 ppm and the spectral curve.

In the alkali silicate aqueous solution of the invention, the transmittance (E) within the wavelength region of 1000 to 200 nm, as measured by an absorptiometry, is in the range of preferably 90 to 100%, more preferably 95 to 100%.

The transmittance of the usual water glass is similar to the above, but the transmittance of the colloidal silica within the wavelength region of 200 nm to 380 nm is extremely low and 10 to 0%. It can be seen from this result that the alkali silicate aqueous solution of the invention has properties close to those of water glass.

Further, the alkali silicate aqueous solution of the invention has an electric conductivity (F) of preferably 2.1 to 35 mS/cm, more preferably 2.1 to 16 mS/cm, particularly preferably 5.0 to 11.0 mS/cm. Because of such a high electric conductivity, the alkali silicate aqueous solution of the invention is a highly desalted solution and is a stable solution free from flocculation caused by silicic acid anions.

As described above, the alkali silicate aqueous solution of the invention has intermediate characteristics between water glass and colloidal silica and has a high molar ratio, a high silicon content and a high anionic activity.

Although there is no specific limitation on the process for preparing the above-mentioned novel alkali silicate aqueous solution, the present inventor has found that the novel alkali silicate aqueous solution can be prepared efficiently and stably by the following first and second processes.

The first process for preparing an alkali silicate aqueous solution according to the invention comprises dealkalizing a starting alkali silicate aqueous solution, which has a molar ratio ($SiO_2/(A_2O+B)$) (A: alkali metal, B: $NH_3$)) of less than 4 and a silicon concentration in terms of an oxide ($SiO_2$ concentration) of 2.0 to 12.0% by weight, by means of an electro-dialysis device.

In the starting alkali silicate aqueous solution, the molar ratio of silicon to an alkali ($SiO_2/(A_2O+B)$) (A: alkali metal, B: $NH_3$)) is less than 4, preferably 1.5 or more but less than 4.0, more preferably about 2.8 to 3.5. The silicon concentration in terms of an oxide ($SiO_2$ concentration) is in the range of 2.0 to 12.0% by weight, preferably 3.0 to 12.0% by weight, more preferably about 4.5 to 12.0% by weight.

In the electro-dialysis device, between an anode and a cathode, cation exchange membranes 1 and anion exchange membranes 2 are alternately disposed and desalting zones 3 and concentration zones 4 are alternately arranged, as shown in FIG. 1. As the electro-dialysis device of this constitution, hitherto known devices are employable without any restriction. That is to say, also as the electrodes, ion exchange membranes and other necessary members to constitute the electro-dialysis device, those publicly known are employable without any restriction. For example, hydrocarbon type cation exchange membranes and anion exchange membranes, which generally have a sulfonic acid group as a cation exchange group and a quaternary ammonium group as an anion exchange group and include a styrene/divinylbenzene copolymer as a reinforcing substrate, are industrially used as the ion exchange membranes. Further, fluorine-containing ion exchange membranes using a fluorine-containing polymer as a material are also employable.

In the electro-dialysis device, it is preferable to use alkali-resistant ion exchange membranes because the starting alkali silicate aqueous solution to be subjected to electro-dialysis is alkaline and caustic alkali must be concentrated (produced).

In the electro-dialysis, a starting alkali silicate aqueous solution is fed to the desalting zone 3 of the electro-dialysis device and water or a dilute caustic alkali aqueous solution is fed to the concentration zone 4 of the device, to perform electro-dialysis. The alkali metal ion (e.g., $Na^+$) present in the desalting zone 3 passes into the concentration zone 4 through the cation exchange membrane 1 and the hydroxide ion ($OH^-$) present in the desalting zone 3 passes into the concentration zone 4 through the anion exchange membrane 2. Thus, desalting is carried out in the desalting zone 3. On the other hand, in the concentration zone 4, concentration of the alkali metal ion and the hydroxide ion from the desalting zone 3 is carried out to obtain a caustic alkali aqueous solution.

Although the operational conditions of the electro-dialysis device vary depending on the size of the device, the concentration of the starting alkali silicate aqueous solution, etc., the electric voltage is controlled so as to be constant at 0.6 V/pair, and the feed rate of the starting alkali silicate aqueous solution to the desalting zone is suitably about 3.1 l/min. To the concentration zone, water or a dilute caustic alkali aqueous solution is fed at a rate of about 3.1 l/min.

From the desalting zone 3, an alkali silicate aqueous solution (dealkalized solution) having been lowered in the alkali concentration by the dealkalization is obtained.

In order to inhibit precipitation of silica solids with raising the molar ratio ($SiO_2/(A_2O+B)$), it is desirable to adjust the molar ratio of the alkali silicate aqueous solution obtained from the desalting zone 3 to preferably 4.0 to 30, more preferably 9 to 26, particularly preferably about 12 to 21.

By appropriate selection of the electro-dialysis conditions, particularly electric conductivity, the molar balance ($SiO_2/(A_2O+B)$) of the alkali silicate aqueous solution can be controlled. In general, when the electric conductivity is high, the value of $SiO_2/(A_2O+B)$ tends to be low, and when the electric conductivity is low, the value of $SiO_2/(A_2O+B)$ tends to be high.

In the first process, a starting alkali silicate aqueous solution having a relatively high silicon concentration is used, and therefore the silicon concentration of the resulting alkali silicate aqueous solution becomes preferably 6.8 to 12% by weight, more preferably 6.8 to 9% by weight, in terms of $SiO_2$.

In the conventional electro-dialysis of an alkali silicate aqueous solution, a starting alkali silicate aqueous solution having a relatively low silicon concentration is used in order to inhibit clogging of ion exchange membranes and thereby perform continuous operation. That is to say, the concentration of the starting solution is at most about 6.0% by weight in terms of $SiO_2$, and the concentration of the resulting dealkalized solution is at most about 6.2% by weight in terms of $SiO_2$. In contrast therewith, a starting alkali silicate aqueous solution having a relatively high silicon concentration in terms of $SiO_2$ is used in the first process of the invention, as described above, and hence a dealkalized solution (alkali silicate aqueous solution) having a high silicon concentration in terms of $SiO_2$ can be obtained. As a result, the high-molar ratio active alkali silicate aqueous solution of the invention satisfying the aforesaid properties (A) and (B), preferably further satisfying the aforesaid properties (C) to (F), can be obtained.

Through the electro-dialysis, a caustic alkali aqueous solution is obtained from the concentration zone 4. In the caustic alkali aqueous solution, silicic acid having passed through the ion exchange membrane during the course of dialysis is sometimes included in a trace amount, i.e., about 0.1 to 1% by weight. Such a caustic alkali aqueous solution can be recycled as it is in the case where inclusion of a trace amount of silicic acid makes no matter, for example, use as an alkali source for preparing an alkali silicate aqueous solution that becomes a starting material for the preparation of a silicic acid sol. Further, such a caustic alkali aqueous solution can also be used for the preparation of alkali silicate of JIS No. 1 or No. 2, sodium metasilicate and sodium orthosilicate each of which has a low $SiO_2/A_2O$ ratio.

By allowing the solution of the concentration zone 4 to retain therein during the electro-dialysis, the alkali concentration can be lowered.

In the first process of the invention, a reverse osmosis membrane method may be carried out to further concentrate the dealkalized solution (alkali silicate aqueous solution) obtained from the desalting zone.

As the reverse osmosis membrane, an alkali-resistant composite membrane is preferably used because the dealkalized solution contains a trace amount of an alkali. The fractional molecular weight of the reverse osmosis membrane is in the range of preferably 100 to 20000, more preferably 100 to 1000, particularly preferably 100 to 800. The reverse osmosis membrane method has a feature that water content is removed with small energy consumption without evaporating water, whereby recovery of a valuable product (alkali silicate herein) can be performed in a solution state and concentration can be performed stably and efficiently. In the conventional method to concentrate colloidal silica, such as an evaporation concentration method wherein concentration is carried out by raising the temperature to 100° C. that is a boiling point of water or a vacuum distillation method wherein concentration is carried out by lowering the boiling point of water under vacuum, particles of the colloidal silica are allowed to grow especially under the heating conditions. Therefore, some silicic acid anions are only present on the particle surfaces, and the activity is liable to be lost.

On the other hand, an ultrafiltration method wherein water content is removed using an organic thin film such as a film of polysulfone, polyacrylonitrile, cellulose acetate, nitrocellulose or cellulose is generally used from the viewpoints of energy and ease of condition control (see U.S. Pat. No. 3,969,266, U.K. Patent No. 1,148,950 and Japanese Patent Laid-Open Publication No. 15022/1983).

In the ultrafiltration method, however, there is a disadvantage that useful and highly active silicic acid anions which appear by the electro-dialysis are removed.

In contrast therewith, the reverse osmosis membrane method wherein organic thin films stable in a strong alkali aqueous solution are sterically arranged to constitute a module of excellent volume efficiency is energy-saving, compact and easy in condition control and is capable of performing recovery of a valuable product by concentration without application of heat and without modification of the product.

In the reverse osmosis, it is desirable to adjust the pressure (at the entrance of the reverse osmosis module) to preferably not more than 4.0 MPa, more preferably about 3.2 to 3.8 MPa.

It is desirable to adjust the solution temperature to about 35 to 40° C.

By the use of the reverse osmosis membrane method in combination, the alkali silicate aqueous solution obtained by the electro-dialysis can be further concentrated to a silicon concentration of preferably 3.0 to 30.0% by weight, more preferably about 6.5 to 30% by weight, in terms of $SiO_2$.

When the reverse osmosis membrane method is used in combination, such a high-silicon concentration solution as mentioned above has not to be used as the starting alkali silicate aqueous solution.

That is to say, the second process for preparing an alkali silicate aqueous solution according to the invention comprises:

dealkalizing a starting alkali silicate aqueous solution having a molar ratio ($SiO_2/(A_2O+B)$) of less than 4 by means of an electro-dialysis device, and concentrating the dealkalized solution by a reverse osmosis membrane method.

In the starting alkali silicate aqueous solution, the molar ratio ($SiO_2/(A_2O+B)$) of silicon to an alkali (alkali has the same meaning as previously described) is less than 4, preferably 1.5 or more but less than 4.0, more preferably about 2.8 to 3.5. Although the silicon concentration in terms of an oxide ($SiO_2$ concentration) is not specifically restricted, it is in the range of 2.0 to 12.0% by weight, preferably 3.0 to 12.0% by weight, more preferably about 4.5 to 12.0% by weight.

The device and the conditions used for the electro-dialysis are the same as those in the aforesaid first process.

In order to inhibit precipitation of silica solids with raising the molar ratio ($SiO_2/(A_2O+B)$), the molar ratio ($SiO_2/(A_2O+B)$) of the dilute alkali silicate aqueous solution (dealkalized solution) having been lowered in the alkali concentration and obtained from the desalting zone 3 is desirably adjusted to preferably 4.0 to 30, more preferably 9 to 26, particularly preferably about 12 to 21.

In the second process, it is desirable to adjust the silicon concentration of the dealkalized solution to preferably 3.0 to 10.0% by weight, more preferably about 4.0 to 8.0% by weight, in terms of $SiO_2$.

In the second process, then, the dealkalized solution obtained from the desalting zone is concentrated by a reverse osmosis membrane method.

The reverse osmosis membrane method is carried out in the same manner as previously described.

By the reverse osmosis membrane method, water. content is removed from the dealkalized solution to concentrate the dealkalized solution (alkali silicate solution). As a result, the high-molar ratio active alkali silicate aqueous solution of the invention satisfying the aforesaid properties (A) and (B), preferably further satisfying the aforesaid properties (C) to (F), can be obtained.

The alkali concentration (in terms of an oxide) of the high-molar ratio active alkali silicate aqueous solution obtained by the invention is lowered to 0.4% by weight or less, but when needed, the alkali concentration can be further lowered by bringing the solution into contact with a cation exchange resin. As the cation exchange resin, R—$SO_3H$ type, R—COOH type and R—OH type cation exchange resins can be used without any restriction. The contact with the ion exchange resin may be carried out after the electro-dialysis or after the reverse osmosis.

By bringing the high-molar ratio active alkali silicate aqueous solution obtained by the electro-dialysis or by the electro-dialysis and the reverse osmosis membrane method into direct contact with the cation exchange resin, desalting proceeds in the alkali solution, whereby the molar ratio ($SiO_2/(A_2O+B)$) can be further enhanced. The contact with the cation exchange resin can be carried out by, for example, charging a column of 200 to 1000 $cm^3$ with 240 to 530 $cm^3$ of a cation exchange resin, washing the cation exchange resin with water and then passing the alkali silicate aqueous solution through the column under the conditions of pH of 5.0 to 6.0 and a flow rate of 4 to 25 ml/sec.

The high-molar ratio active alkali silicate aqueous solution of the invention can be used for various purposes, and owing to the low alkali content, this solution is useful as a ground consolidation agent. For example, when construction work is made on the poor ground, the ground consolidation agent is poured into the ground to impart strength and durability to the ground. If an alkali is contained in a ground consolidation agent, there is a fear of contamination of soil or underground water. According to the invention, however, the alkali content can be extremely decreased, and hence the ground consolidation agent can be used without a fear of contamination.

Further, the high-molar ratio active alkali silicate aqueous solution of the invention functions also as a precursor of colloidal silica. Colloidal silica is prepared from the high-molar ratio active alkali silicate aqueous solution of the invention in the following manner. The alkali silicate aqueous solution of the invention is temporarily made acidic with a mineral acid, and the salt concentration of the alkali silicate or the like is controlled, whereby colloidal silica containing no salt so as to keep stability is prepared. Around the particles of the colloidal silica, positive counter ions in the amounts balanced with the amounts of the surface electric charges are widely distributed to averagely promote particle growth. According to this process, colloidal silica of high quality can be prepared easily and at a low cost.

As described above, the high-molar ratio active alkali silicate aqueous solution of the invention can be used in various fields where silica fine particles have been conventionally used, and this alkali silicate aqueous solution can be used for, for example, heat-resistant binder, catalyst, anti-slip agent for wrapping paper, anti-slip matting agent, various coating agents, abrasive for wafer abrasion, reinforcing agent, flocculating agent and ink-jet printing fixing agent.

According to the present invention described above, an alkali silicate aqueous solution having intermediate characteristics between water glass and colloidal silica and having a high molar ratio ($SiO_2/(A_2O+B)$), a high silicon content and a high anionic activity, a process for preparing the solution and uses of the solution are provided.

EXAMPLES

The present invention is further described with reference to the following examples, but it should be construed that the invention is in no way limited to those examples.

The electro-dialysis device and the reverse osmosis device used in the examples are as follows.

Electro-Dialysis Device (Manufactured by Tokuyama K.K.)
 Anion exchange membrane (10 membranes): AHA (trade name), available from Tokuyama K.K.
 Cation exchange membrane (12 membranes): CMB (trade name), available from Tokuyama K.K.
 Electrode material: Ni plate
 Distance between electrodes: 26.2 mm
 Distance between anion exchange membrane and cation exchange membrane: 0.7 mm
 Area of ion exchange membrane: 2 $dm^2$/membrane Reverse Osmosis Device (Manufactured by Toray Engineering)
 Reverse osmosis membrane: mini-spiral membrane (alkali-resistant synthetic composite membrane, fractional molecular weight: 200, membrane area: 1.6 $m^2$, φ2.0×40 L)
 High-pressure circulating pump (SUS316L/NBR)
  normal: 5-12.5 L/min, 40 $kgf/cm^2$
  pressure-resistant: 10 L/min, 70 $kgf/cm^2$
 Spiral vessel: for φ2.0×40 L, FRP withstand pressure 70 $kgf/cm^2$
 Accumulator: bladder type, 100 cc, maximum working pressure 70 $kgf/cm^2$ Example 1

The specific gravity and the composition of the alkali silicate aqueous solution used as a starting material are as follows.
 Specific gravity (15° C.): 1.404
 $SiO_2$ (%): 28.12
 $Na_2O$ (%): 9.21
 $SiO_2/Na_2O$ (molar ratio): 3.15

The alkali silicate aqueous solution was diluted with water to obtain an alkali silicate aqueous solution having a silicic acid concentration (in terms of $SiO_2$) of 6% by weight.

The thus obtained starting alkali silicate aqueous solution was fed to a desalting zone of such an electro-dialysis device as previously specified, and to a concentration zone of the device was fed a dilute caustic soda solution.

Then, electro-dialysis was initiated through a constant voltage operation at 0.6 V/pair (stack voltage: 6 V/10 pairs) and a tank (including electrode zone) voltage of 9 to 10 V. As a result, the initial conductivity was 24 mS/cm. The electro-dialysis was carried out until the conductivity was lowered to less than 4.5 mS/cm from the initiation. The average dialysis time necessary for the lowering of the conductivity to less than 4.5 mS/cm was 80 minutes. The dealkalized solution obtained from the desalting zone had a silica content ($SiO_2$) of 6.4% by weight and an alkali content ($Na_2O$) of 0.35% by weight.

The dealkalized solution obtained from the desalting zone was temperature-controlled to 30 to 40° C., fed to a concentration tank of the reverse osmosis device and concentrated under the conditions of an inlet flow rate of 10 L/min, an average pressure of 3.0 MPa and a flux (30° C.) of 35 to 28 kg /m²-hr, to obtain a high-molar ratio sodium silicate aqueous solution having the following composition and properties.

Figure 2:
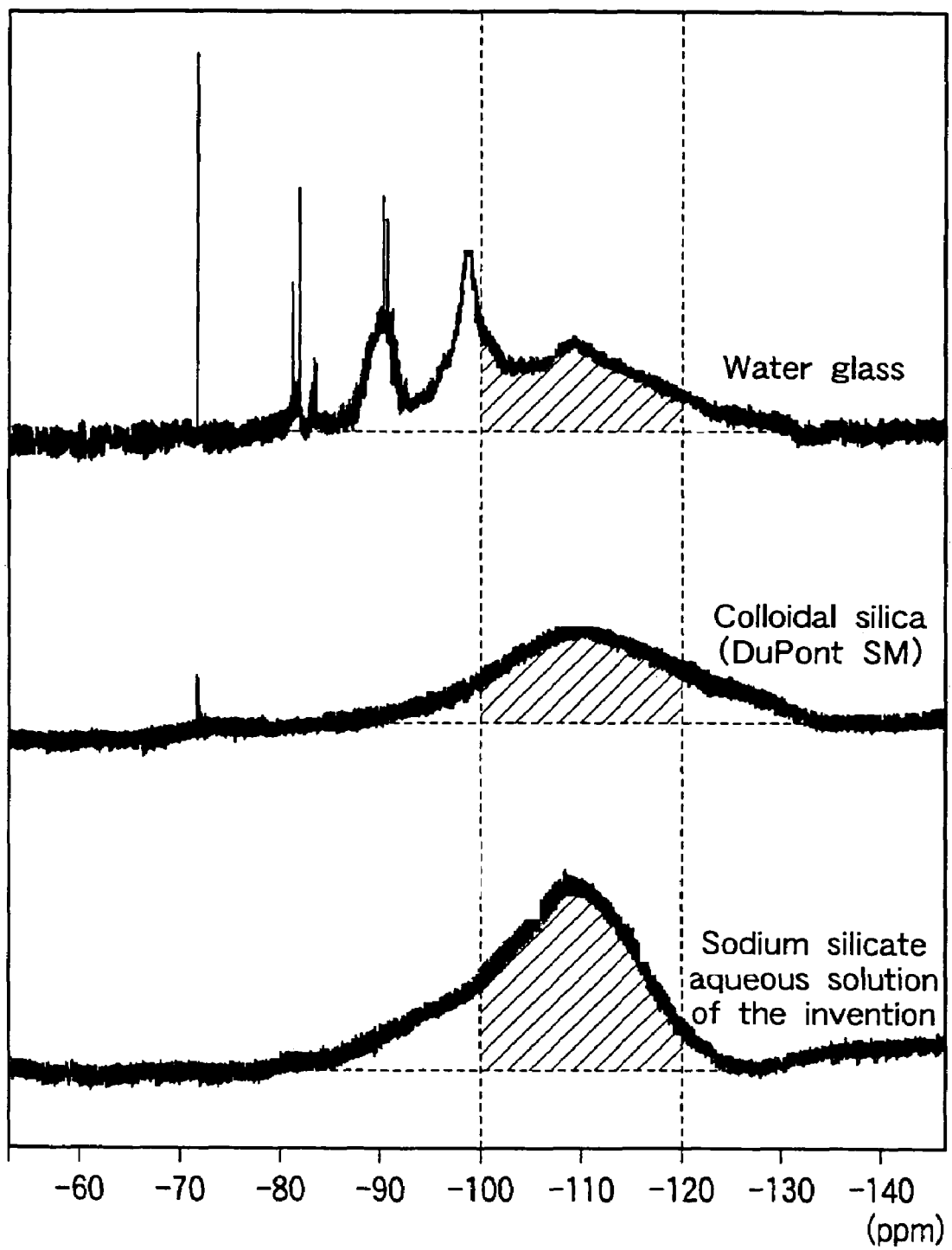
FIG. 2 is a graph comparing $^{29}$Si-NMR spectra of a sodium silicate aqueous solution of the present invention, water glass and colloidal silica (DuPont SM).

(A) Molar ratio ($SiO_2/Na_2O$) 14.8
(B) $SiO_2$ concentration: 16.3% by weight
(C) ζ potential: −58.6 MV
(D) The $^{29}$Si-NMR spectrum is shown in FIG. 2, in which $^{29}$Si-NMR spectra of the following water glass and colloidal silica measured under the same conditions are shown for comparison.

Water Glass (Dilute No. 3 Sodium Silicate, Available from Toso Sangyo K.K.)
Specific gravity (15° C.): 1.064
$SiO_2$ (%): 5.80
$Na_2O$ (%): 1.90
$SiO_2/Na_2O$ (molar ratio): 3.15
ζ potential: −27.5 MV
Colloidal Silica (DuPont SM)
Specific gravity (15° C.): 1.216
$SiO_2$ (%): 30
$Na_2O$ (%): 0.56
$SiO_2/Na_2O$ (molar ratio): 55.26
ζ potential: −34.0 MV The peak area at the chemical shift of −100 to −120 ppm in the $^{29}$Si-NMR spectrum of the sodium silicate aqueous solution of the invention is 2.28 times the peak area of the water glass and is 1.27 times the peak area of the colloidal silica (DuPont SM).

(E) Transmittance within the wavelength region of 1000 to 200 nm: 95 to 100%

Figure 3:
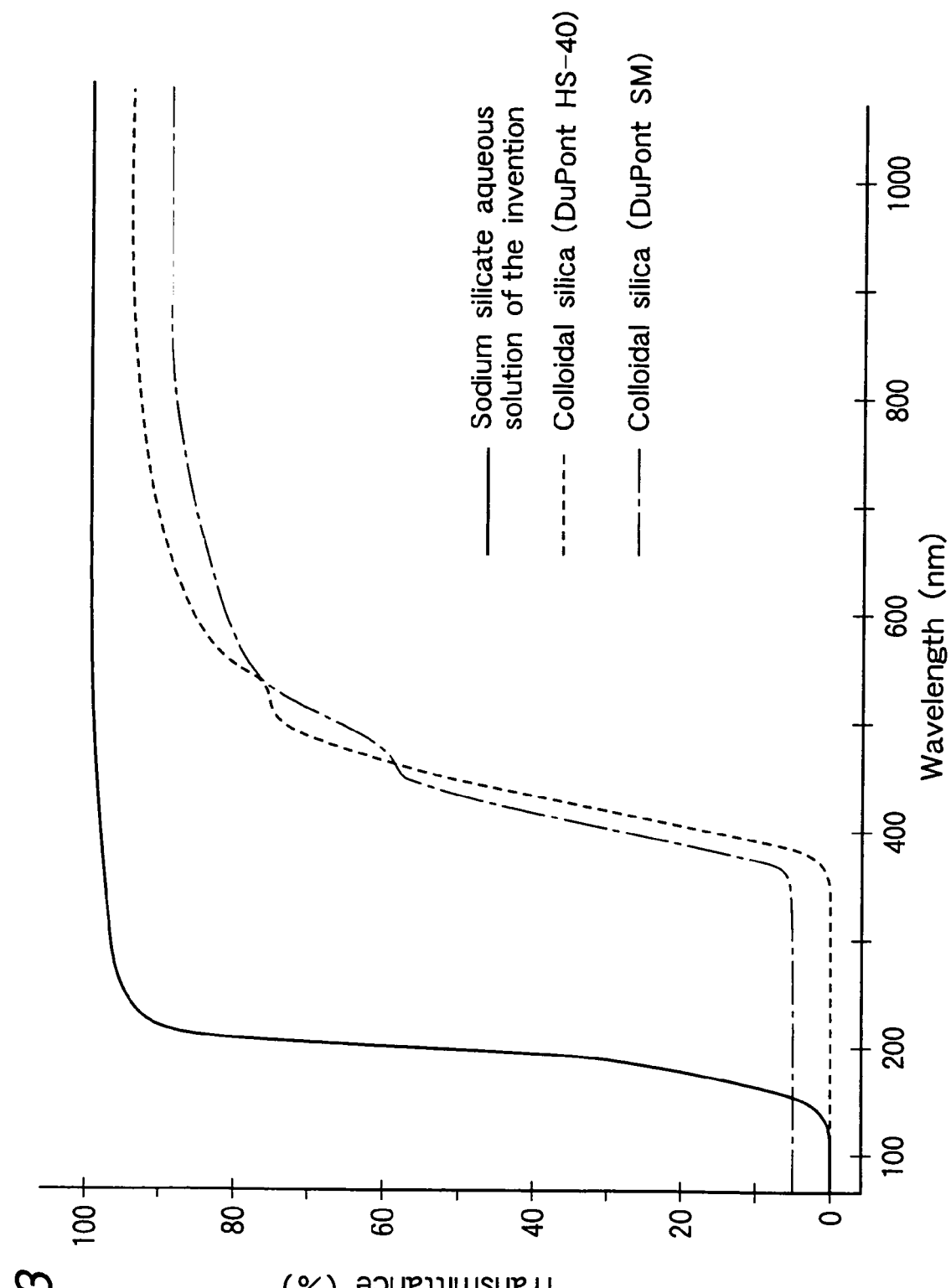
FIG. 3 is a graph comparing results of ultraviolet to visible spectrophotometry of a sodium silicate aqueous solution of the present invention, colloidal silica (DuPont SM) and colloidal silica (DuPont HS-40).

The result of the ultraviolet to visible spectrophotometry is shown in FIG. 3, in which the results of the ultraviolet to visible spectrophotometry of the colloidal silica (DuPont SM) and the following colloidal silica measured under the same conditions are shown for comparison.

Colloidal Silica (DuPont HS-40)
Specific gravity (15° C.): 1.305
$SiO_2$ (%): 40
$Na_2O$ (%): 0.41
$SiO_2/Na_2O$ (molar ratio): 100.68
ζ potential: −36.7 MV
(F) Electric conductivity: 7.5 mS/cm Methods and devices to measure the properties are as follows.
(A) Molar ratio ($SiO_2/Na_2O$)
$SiO_2$ and $Na_2O$ were analyzed in accordance with JIS K1408, and the molar ratio was calculated.
(B) $SiO_2$ concentration
$SiO_2$ was analyzed in accordance with JIS K1408.
(C) ζ potential
The ζ potential was measured by an electrophoresis light scattering method using DELSA4403X manufactured by Beckmann Coalter Co.
(D) $^{29}$Si-NMR measurement The $^{29}$Si-NMR was measured by means of an ALPHA-500 Model (500 MHz) manufactured by Japan Electron Optics Laboratory Co., Ltd.
(E) Transmittance
The transmittance was measured by means of an UV-550 Model manufactured by Nippon Bunko.
(F) Electric conductivity
The electric conductivity was measured by means of an ES-12 Model manufactured by Horiba Seisakusho.

Example 2

The specific gravity and the composition of the alkali silicate aqueous solution used as a starting material are as follows.
Specific gravity (15° C.): 1.404
$SiO_2$ (%): 28.12
$Na_2O$ (%): 9.21
$SiO_2/Na_2O$ (molar ratio): 3.15

The alkali silicate aqueous solution was diluted with water to obtain an alkali silicate aqueous solution having a silicic acid concentration (in terms of $SiO_2$) of 7.7% by weight.

The thus obtained starting alkali silicate aqueous solution was fed to a desalting zone of such an electro-dialysis device as previously specified, and to a concentration zone of the device was fed a dilute caustic soda solution.

Then, electro-dialysis was initiated through a constant voltage operation at 0.6 V/pair (stack voltage: 6 V/10 pairs) and a tank (including electrode zone) voltage of 9 to 10 V. As a result, the initial conductivity was 24 mS/cm. The electro-dialysis was carried out until the conductivity was lowered to less than 4.5 mS/cm from the initiation. The average dialysis time necessary for the lowering of the conductivity to less than 4.5 mS/cm was 80 minutes. The specific gravity and the composition of the dealkalized solution obtained from the desalting zone are as follows.

Specific gravity (15° C.): 1.060
$SiO_2$ (%): 8.03
$Na_2O$ (%): 0.78
$SiO_2/Na_2O$ (molar ratio): 10.62

The dealkalized solution obtained from the desalting zone was brought into contact with an ion exchange resin. That is to say, 280 cm³ of a weak acid cation exchange resin Dia Ion WK40 (available from Nippon Rensui K.K.) was charged in a column (φ2.8×H63 cm), washed with water and adjusted to pH 5.79. Then, 2000 ml of the dealkalized aqueous solution was fed at a flow rate of 12.7 ml/sec to perform desalting.

Thus, a high-molar ratio sodium silicate aqueous solution having the following composition and properties was obtained.

(A) Molar ratio ($SiO_2/Na_2O$): 21.22
(B) $SiO_2$ concentration: 8.02% by weight Example 3

The specific gravity and the composition of the alkali silicate aqueous solution used as a starting material are as follows.
Specific gravity (15° C.): 1.404
$SiO_2$ (%): 28.12
$Na_2O$ (%): 9.21
$SiO_2/Na_2O$ (molar ratio): 3.15

The alkali silicate aqueous solution was diluted with water to obtain an alkali silicate aqueous solution having a silicic acid concentration (in terms of $SiO_2$) of 7.7% by weight.

The thus obtained starting alkali silicate aqueous solution was fed to a desalting zone of such an electro-dialysis device as previously specified, and to a concentration zone of the device was fed a dilute caustic soda solution.

Then, electro-dialysis was initiated through a constant voltage operation at 0.6 V/pair (stack voltage: 6 V/10 pairs) and a tank (including electrode zone) voltage of 9 to 10 V. As a result, the initial conductivity was 24 mS/cm. The electro-dialysis was carried out until the conductivity was lowered to less than 4.5 mS/cm from the initiation. The average dialysis time necessary for the lowering of the conductivity to less than 4.5 mS/cm was 80 minutes. The specific gravity and the composition of the dealkalized solution obtained from the desalting zone are as follows.

Specific gravity (15° C.): 1.060
$SiO_2$ (%): 8.03
$Na_2O$ (%): 0.78
$SiO_2/Na_2O$ (molar ratio): 10.62.

The dealkalized solution obtained-from the desalting zone was temperature-controlled to 30 to 40° C., fed to a concentration tank of the reverse osmosis device and concentrated under the conditions of an inlet flow rate of 10 L/min, an average pressure of 3.0 MPa and a flux (30° C.) of 35 to 28 kg/m$^2$-hr, to obtain a sodium silicate aqueous solution having the following specific gravity and composition.

Specific gravity (15° C.): 1.121
$SiO_2$ (%): 16.3
$Na_2O$ (%): 1.45
$SiO_2/Na_2O$ (molar ratio): 11.60

The resulting sodium silicate aqueous solution was brought into contact with an ion exchange resin. That is to say, 197 cm$^3$ of a weak acid cation exchange resin Dia Ion WK40 (available from Nippon Rensui K.K.) was charged in a column (φ2.8×H63 cm), washed with water and adjusted to pH 5.60. Then, 1000 ml of the alkali silicate aqueous solution was fed at a flow rate of 6.41 ml/sec to perform desalting.

Thus, a high-molar ratio sodium silicate aqueous solution having the following composition and properties was obtained.

(A) molar ratio ($SiO_2/Na_2O$): 28.88
(B) $SiO_2$ concentration: 16.23% by weight

What is claimed is:

1. An alkali silicate aqueous solution having the following properties:
   (A) the molar ratio of silicon to an alkali ($SiO_2/(A_2O+B)$ (A: alkali metal, B: $NH_3$)) is in the range of 9 to 26,
   (B) the silicon concentration in terms of an oxide ($SiO_2$ concentration) is in the range of 6.8 to 30% by weight; and
   (C) the ξ potential is in the range of −40 MV to −80 MV.

2. The alkali silicate aqueous solution as claimed in claim 1, having the following properties:
   (D) the peak area at the chemical shift of −100 to −120 ppm in the $^{29}$Si-NMR measurement is 1.35 times or more of the peak area of water glass at the chemical shift of −100 to −120 ppm measured by $^{29}$Si-NMR under the same conditions as in the above measurement and is 1.20 times or more of the peak area of colloidal silica at the chemical shift of −100 to 120 ppm measured by $^{29}$Si-NMR under the same conditions as in the above measurement.

3. The alkali silicate aqueous solution as claimed in claim 2, having the following properties:
   (E) the transmittance within the wavelength region of 1000 to 200 nm measured by an absorptiometry is in the range of 90 to 100%.

4. The alkali silicate aqueous solution as claimed in claim 2, having the following properties:
   (F) the electric conductivity is in the range of 2.1 to 30 mS/cm.

5. A ground consolidation agent containing the alkali silicate aqueous solution of claim 2 as a main agent.

6. The alkali silicate aqueous solution as claimed in claim 1, having the following properties:
   (E) the transmittance within the wavelength region of 1000 to 200 nm measured by an absorptiometry is in the range of 90 to 100%.

7. The alkali silicate aqueous solution as claimed in claim 6, having the following properties:
   (F) the electric conductivity is in the range of 2.1 to 30 mS/cm.

8. A ground consolidation agent containing the alkali silicate aqueous solution of claim 6 as a main agent.

9. The alkali silicate aqueous solution as claimed in claim 1, having the following properties:
   (F) the electric conductivity is in the range of 2.1 to 30 mS/cm.

10. A ground consolidation agent containing the alkali silicate aqueous solution of claim 9 as a main agent.

11. A process for preparing an alkali silicate aqueous solution as claimed in claim 1, comprising dealkalizing a starting alkali silicate aqueous solution, which has a molar ratio ($SiO_2/(A_2O+B)$) (A: alkali metal, B: $NH_3$)) of less than 4 and a silicon concentration in terms of an oxide ($SiO_2$ concentration) of 2.0 to 12.0% by weight, by means of an electro-dialysis device.

12. The process for preparing an alkali silicate aqueous solution as claimed in claim 11, wherein the resulting dealkalized solution is concentrated by a reverse osmosis membrane method.

13. The process for preparing an alkali silicate aqueous solution as claimed in claim 12, wherein reverse osmosis is carried out using an alkali-resistant composite membrane of a fractional molecular weight of 100 to 20000.

14. The process for preparing an alkali silicate aqueous solution as claimed in claim 13, wherein after the electro-dialysis and/or the reverse osmosis, the resulting alkali silicate aqueous solution is brought into contact with a cation exchange resin.

15. The process for preparing an alkali silicate aqueous solution as claimed in claim 11, wherein after the electro-dialysis, the resulting alkali silicate aqueous solution is brought into contact with a cation exchange resin.

16. The process for preparing an alkali silicate aqueous solution as claimed in claim 12, wherein after the electro-dialysis and/or the reverse osmosis, the resulting alkali silicate aqueous solution is brought into contact with a cation exchange resin.

17. A process for preparing an alkali silicate aqueous solution as claimed in claim 1, comprising:
   dealkalizing a starting alkali silicate aqueous solution having a molar ratio ($SiO_2/(A_2O+B)$) (A: alkali metal, B: $NH_3$)) of less than 4 by means of an electro-dialysis device, and
   concentrating the dealkalized solution by a reverse osmosis membrane method.

18. The process for preparing an alkali silicate aqueous solution as claimed in claim 17, wherein reverse osmosis is carried out using an alkali-resistant composite membrane of a fractional molecular weight of 100 to 20000.

19. The process for preparing an alkali silicate aqueous solution as claimed in claim 17, wherein after the electro-dialysis and/or the reverse osmosis, the resulting alkali silicate aqueous solution is brought into contact with a cation exchange resin.

20. The alkali silicate aqueous solution as claimed in claim 1, which is obtained by the process comprising dealkalizing a starting alkali silicate aqueous solution, which has a molar ratio ($SiO_2/A_2O+B$) (A: alkali metal, B: $NH_3$)) of less than 4 and a silicon concentration in terms of an oxide ($SiO_2$ concentration) of 2.0 to 12.0% by weight, by means of an electro-dialysis device.

21. A ground consolidation agent containing the alkali silicate aqueous solution of claim 1 as a main agent.

* * * * *

UNITED STATES PATENT AND TRADEMARK OFFICE
CERTIFICATE OF CORRECTION

PATENT NO. : 7,285,163 B2  Page 1 of 1
APPLICATION NO. : 10/472015
DATED : October 23, 2007
INVENTOR(S) : Kouji Miyabara It is certified that error appears in the above-identified patent and that said Letters Patent is hereby corrected as shown below:

On the Title Page, Item (56) References Cited, U.S. PATENT DOCUMENTS, Column 2, fourth reference, "4,557,615 A   12/1985   Scott et al." should read -- 4,557,815 A   12/1985   Scott et al. --

Column 13, Line 65, Claim 2, "-100 to 120 ppm" should read -- -100 to -120 ppm --

Signed and Sealed this

Twenty-ninth Day of September, 2009

David J. Kappos
*Director of the United States Patent and Trademark Office*